(12) United States Patent
Kortes

(10) Patent No.: US 7,390,521 B2
(45) Date of Patent: Jun. 24, 2008

(54) COMPOSITIONS WITH A CHICKEN FLAVOUR, USE AND PRODUCTION THEREOF

(75) Inventor: Jan Gerrit Kortes, Leusden (NL)

(73) Assignee: DSM IP Assets B.V., Te Heerlen (NL)

( * ) Notice: Subject to any disclaimer, the term of this patent is extended or adjusted under 35 U.S.C. 154(b) by 521 days.

(21) Appl. No.: 10/499,550

(22) PCT Filed: Dec. 18, 2002

(86) PCT No.: PCT/EP02/14528

§ 371 (c)(1),
(2), (4) Date: Jun. 21, 2004

(87) PCT Pub. No.: WO03/051139

PCT Pub. Date: Jun. 26, 2003

(65) Prior Publication Data

US 2005/0042349 A1  Feb. 24, 2005

(30) Foreign Application Priority Data

Dec. 19, 2001  (EP)  ................................. 01204990

(51) Int. Cl.
*A23L 1/22* (2006.01)
(52) U.S. Cl. .................. 426/533; 426/650; 426/656; 426/658
(58) Field of Classification Search ............. 426/533, 426/534, 650, 656, 658
See application file for complete search history.

(56) References Cited

U.S. PATENT DOCUMENTS 3,689,289 A  9/1972  Perret .................... 99/140

FOREIGN PATENT DOCUMENTS

| EP | 0136428 | 4/1985 |
|---|---|---|
| EP | 0450672 | 10/1991 |
| EP | 0463660 | 1/1992 |
| EP | 0568608 | 9/2000 |
| WO | WO 96/21037 | 7/1996 |

OTHER PUBLICATIONS

Belikov et al., Nature of Some Food Odors, Chemical Abstracts (1965) 62 (12):abstract No. 15339d.
International Search Report for PCT/EP02/14528, mailed on May 2, 2003, 2 pages.
Motram, Food Chemistry (1998) 62:415-424.
Schrödter et al., Tech. Charact. Prod. Appl. Food Flavours (1988):107-114.

*Primary Examiner*—Leslie Wong
(74) *Attorney, Agent, or Firm*—Nixon & Vanderhye P.C.

(57) ABSTRACT

The present invention provides with a method for producing compositions with a chicken flavour. The compositions of the invention can be obtained by applying the following method: (a) preparing a mixture comprising at least one reducing carbohydrate and at least one amino acid; (b) keeping the mixture at a temperature sufficient for the reducing carbohydrate and amino acid to react with each other; (c) adding to the mixture a composition comprising arachidonic acid, whereby said arachidonic acid is esterified for at least 50% w/w, preferably at least 65% w/w, more preferably at least 80% w/w, most preferably at least 90% w/w to the glycerol moiety of a triglyceride; and (d) keeping the mixture at a temperature sufficient for the chicken flavour to develop; and possibly: (e) drying the composition under mild conditions. The use of an oil rich in arachidonic acid, whereby said arachidonic acid is esterified to the glycerol moiety of a triglyceride, confers an enhanced stability to the compositions obtained. A composition of the invention is stable at room temperature for at least one year.

31 Claims, No Drawings

COMPOSITIONS WITH A CHICKEN FLAVOUR, USE AND PRODUCTION THEREOF

CROSS-REFERENCE TO RELATED APPLICATIONS

This application is the national stage of PCT application PCT/EP02/14528 having an international filing date of 18 Dec. 2002, which claims priority from European application 01204990.4, filed 19 Dec. 2001. The contents of these documents are incorporated herein by reference.

This invention relates to a method for producing a composition with a chicken flavour, to the compositions obtainable by this method and to their use in the flavouring of food products.

The flavour of meat is the result of a complex combination of different reaction pathways occurring during cooking. The Maillard reaction between amino acids and reducing sugars, the related Strecker degradation of amino acids in presence of Maillard-derived dicarbonyl compounds and the auto-oxidation of lipids are the most important examples. All these reactions, their products and their influence on the taste of food have been the subject of several studies (Motram D. S., (1998) *Food Chemistry*, 62, pp. 415-424, "Flavour formation in meat and meat products: a review" and references therein; Schrödter, R., Schliemann, R., Woelm, G., (1988) *Tech. Charact Prod. Appl. Food Flavours*, pp. 107-114, "Study on the effect of fat in meat flavour formation"). In particular it has been found that lipids, especially those rich in polyunsaturated fatty acids, play a major role in determining the special taste of the different meat species. Saturated and unsaturated aldehydes, which are a major lipid-degradation product, are found in high concentrations between the volatiles of cooked meat and they have been shown to participate in reactions with Maillard intermediates. This interaction seems to have a beneficial effect on the taste of meat.

Combinations of Maillard reactions with lipid oxidations have been exploited in the art to produce or enhance meat flavours.

EP-450672 describes the preparation of process flavourings by mildly oxidising a fat, if necessary in the presence of an anti-oxidant, followed by incorporation into a Maillard reaction mixture and by heat treatment. Applicants have found that this process generates a stronger and more balanced process flavouring. However, these compositions have the disadvantage that the production of a good fried chicken character requires the use of chicken fat.

Arachidonic acid has been associated in the art with the production of chicken flavour.

U.S. Pat. No. 3,689,289 describes a chicken flavouring composition comprising a hexose, a bland protein hydrolysate, an arachidonic acid compound selected from the free acid, the methyl or ethyl ester thereof or a mixture thereof, cysteine and/or cystine or a non-toxic salt thereof. The composition can be formulated as a solid blend and marketed as such and the chicken flavour is not produced in the initial dry mix but develops once the mixture is heated in the presence of water for five to ten minutes at a temperature between 60 and 90° C. It is important not to heat the composition above 100° C. for more than ten minutes, as such treatment destroys chicken flavour. The chicken flavour developed by these compositions has the disadvantage of not being very stable. The flavour of these compositions are therefore usually developed at the moment of use, for example while preparing a soup.

The purpose of the invention is to provide compositions with a chicken flavour which are stable in time and which, in a preferred embodiment of the invention, do not require the use of animal products.

SUMMARY OF THE INVENTION

Surprisingly, it has now been found that a composition with a stable chicken flavour can be obtained by applying the following method:
(a) preparing a mixture comprising at least one reducing carbohydrate and at least one amino acid;
(b) keeping the mixture at a temperature sufficient for the reducing carbohydrate and the amino acid to react with each other;
(c) adding to the mixture an composition comprising arachidonic acid, whereby said arachidonic acid is esterified for at least 50% w/w, preferably at least 65% w/w, more preferably at least 80% w/w, most preferably at least 90% w/w to a glycerol moiety of a triglyceride; and
(d) keeping the mixture at a temperature sufficient for the chicken flavour to develop.

The compositions of the invention show several advantages in comparison with those of the prior art.

The composition of the current invention is characterised by an already developed chicken flavour which are stable for at least one year at 25° C. Advantageously we have found that no other flavour disturbing compounds, such as off-tastes, are formed during that year. In non-stable compositions off-tastes like green, ransic fat/oil can be formed (see for example composition A of example 4). At higher temperatures, between 35-45° C., the chicken flavour of the composition remains stable for a period of 6-7 weeks. At about 100° C. the chicken flavour composition is stable for 5 to 10 minutes. By stable is meant that the chicken flavour of the composition is present after storage of the composition for 6 weeks at 35° C. in a closed container. These compositions can therefore be used not only in warm food (like soups etc.) but also on cold ones (e.g., cold pasta or rice, salads etc.). These compositions may be simple to prepare, as they do not require any purification step. They can also be produced starting from cheap, easy to handle, ingredients.

One aspect of the present invention is the use in step (c) of the method of a composition comprising an oil rich in arachidonic acid, whereby said arachidonic acid is esterified to the glycerol moiety of a triglyceride. The said oil can be any fat or oil obtained either from a vegetable, a microbial or an animal source. In a preferred embodiment of the invention the oil is a microbial or vegetable oil. The term 'vegetable oil' is intended to include any fat or oil obtained from a vegetable source. The term 'microbial oil' is intended to include any fat or oil obtained from a microbial source for example by a fermentation process. Microbial oils rich in arachidonic acid, whereby said arachidonic acid is esterified to the glycerol moiety of a triglyceride, may be obtained from fermentation of fungi, for example of fungi of the genus *Mortierella*, for example of the specie *Mortierella alpina*. The production of some of these oils is for example described in the European patent No. 568608.

In a preferred embodiment of the invention the composition comprising arachidonic acid is an oil which comprises at least 70% w/w of triglycerides, more preferably 80% w/w of triglycerides, even more preferably 90% w/w of triglycerides. With respect to the amount of arachidonic acid in the oil, preferably such oil comprises at least 10% w/w, more preferably 20% w/w, more preferably at least 30% w/w of arachidonic acid, whereby said arachidonic acid is esterified to the glycerol moiety of a triglyceride.

The percentage of arachidonic acid or of triglycerides in the oil is usually based on the amount (in weight) of arachidonic acid (unbound form, by breaking/hydrolysis of the ester bond) or triglyceride (in bound form, as ester). Surprisingly, it has been found that the use of oils rich in arachidonic acid whereby said arachidonic acid is esterified to the glycerol moiety of a triglyceride, of which the commercially available Optimar® oil (obtained by DSM N.V., the Netherlands) is an example, confer to the final composition a stable chicken flavour and allow simplification of the preparation process if compared with those of the art which make use of arachidonic acid or its methyl or ethyl esters.

Arachidonic acid can be a very expensive compound, explosively reactive and very sensitive to auto-oxidation. The latter is probably the cause of the instability of the chicken flavours produced using the free acid, as the derived aldehydes are very volatile and evaporate during cooking. Moreover this instability results in ransic off-notes like ransic chicken-fat smell. Surprisingly, it has been found that when the arachidonic acid is in the triglyceride form, the stability of the flavour produced in the composition of the invention is very much increased, probably because of the increased stability of arachidonic acid in triglycerides towards excessive oxidation.

An advantageous aspect of the preferred embodiment of the invention wherein in step (c) a microbial oil or vegetable oil is used, is that the compositions of the invention do not contain any meat or animal fat extract. This is particularly important in the western societies wherein the amount of vegetarians, whether for health or ideological reasons, steadily increases. Besides, the spreading of animal diseases transferable to men which are now accelerated by our global economy, may prompt the consumer to avoid the use of meat or derivatives thereof and to draw his attention towards vegetarian products.

The method of the invention can be split in two parts: a Maillard reaction (step (a) and step (b) of the invention), followed by the development of the chicken flavour characteristic (step (c) and step (d) of the invention). In a preferred embodiment, the invention further comprises drying of the resulting chicken flavoured composition obtained in step (d) (step (e) of the invention).

The components of the reaction mixture may be added and mixed by methods known in the art.

According to the process of the invention, step (a) comprises preparing a Maillard reaction mixture comprising at least a reducing carbohydrate and at least an amino acid. Preferably, the reaction mixture comprises a solvent, preferably water, generally the content of water is between 20 and 80% w/w, more preferably between 30 and 70% w/w, even more preferably between 40 and 60% w/w of the total ingredients, i.e. of all the ingredients, including water, which are added to the composition at any stage of the method preceding step (e). Preferably the at least one reducing carbohydrate is selected from the group of monosaccharides and preferably from the group of: L- or D-ribose, D-xylose, dextrose, L-arabinose, L-rhamnose, L-fructose. More preferably the reducing carbohydrate is dextrose. The present invention does not exclude the possibility of combining more than one reducing carbohydrate in step (a). In the latter case hydrolysates obtained from the chemical or enzymatic degradation of polysaccharides can be used as source of reducing carbohydrates. Preferably, the at least one reducing carbohydrate is between 1 and 10% w/w of the total ingredients, more preferably between 1 and 5% w/w, even more preferably it is 2% w/w of the total ingredients.

In addition to the reducing carbohydrate, the at least one amino acid in step (a) can be any amino acid such as cysteine, cystine, leucine, thiamine, preferably cysteine. Generally, the at least one reducing carbohydrate and the at least one amino acid are in a molar ratio comprised between 0.5 and 1.5, more preferably comprised between 0.7 and 1.2.

It has been found that when also other amino acids are present, a flavour of better quality is obtained. Therefore, in a preferred embodiment of the invention the reaction mixture of step (a) also comprises an autolytic yeast extract like for example the commercially available Gistex® yeast extract (obtained from DSM, The Netherlands). The latter can be used as natural source of amino acids for the Maillard reaction. The yeast extract can also be added in any one or after any one of step (a) to (d). The yeast extract can be added more times in the process. By autolytic yeast extract it is meant the concentrate of the soluble materials obtained from yeast after: a) disruption of the cells and b) auto digestion (autolysis) of the polymeric yeast material effected by the active yeast enzymes released in the medium after cell disruption. The amount of the autolytic yeast extract added is not influencing the development of the chicken flavour and can vary within wide ranges. Generally it is added in an amount between 10 and 70% w/w of the total ingredients. The amount of yeast is expressed as dry yeast matter.

In order to obtain a good chicken flavour with a cooked chicken flavour profile, the pH of the mixture in the method of the invention should be at least 2. In a preferred embodiment of the invention, the pH should be between 4 and 8. In a even more preferred embodiment of the invention, the pH should be between 5 and 7, more preferably between 5.5 and 6. The pH can be adjusted using food acceptable acids or bases well within the knowledge of those skilled in the art.

Generally, in order to perform the Maillard reaction and the related Strecker degradation, the reaction mixture in step (b) can be kept at temperature between 70 and 120° C. for a period of time between 0.5 and 5 hours, more preferably between 1 and 2 hours. In a preferred embodiment of the invention, the reaction is kept at a temperature between 98 and 100° C. for 80 to 100 minutes. In order to avoid loss of solvent during heating, the reaction mixture in step (b) and in step (d) are kept under reflux conditions.

It has been found that the addition of an oil rich in arachidonic acid, whereby said arachidonic acid is esterified to the glycerol moiety of a triglyceride, is very important for the development of the chicken flavour. In step (c) of the process of the invention the reaction mixture obtained after step (b) is generally cooled down at a temperature lower than 80° C. and the oil rich in arachidonic acid, whereby said arachidonic acid is esterified to the glycerol moiety of a triglyceride, is added. In a preferred embodiment of the invention, the oil used is a vegetable oil. Generally, the oil is added in an amount between 0.1 and 2% w/w of the total ingredients, more preferably between 0.2 and 1% w/w, even more preferably between 0.3 and 0.8% w/w, most preferably between 0.4 and 0.6% w/w of the total ingredients. In a preferred embodiment of the invention such oil comprises at least 70% w/w of triglycerides, more preferably 80% w/w, even more preferably 90% w/w of triglycerides. With respect to the amount of arachidonic acid in the oil, such oil preferably comprises at least 10%, preferably at least 20% w/w, more preferably at least 30% w/w of arachidonic acid, whereby said arachidonic acid is esterified to the glycerol moiety of a triglyceride. A triglyceride comprising arachidonic acid may comprise one, two or three arachidonic acid residues. It is understood that not all triglycerides comprised in the oil should be esterified with arachidonic acid.

In fact all amino acids, yeast extracts and carbohydrates are used to form the base flavour, the triglyceride/arachidonic acid will give the final charactristic fatty, boiled chicken note to the flavour.

To obtain a good and stable chicken flavour it is advantageous to heat in step (d) of the process of the invention the reaction mixture prepared in step (c). The reaction mixture should be heated for at least 5 minutes at at least 70° C. Thus in a preferred embodiment of the invention the composition obtained in step (c) is heated for 5 to 60 minutes at a temperature between 70 and 100° C. In the most preferred embodiment of the invention, the composition is heated for 30 minutes at 80° C.

In order to obtain a chicken flavour with a good chicken flavour profile, the composition obtained after step (d) is preferably dried in step (e) of the process of the invention. Preferably the composition is mildly dried, e.g. oven-dried, but also other methods like e.g. belt-drying, spray-drying or drum-drying are possible. In a preferred embodiment, the composition is dried under vacuum at a temperature between 40 and 80° C., more preferably at 80° C. Generally, the composition is oven-dried at a vacuum lower than 50 mbar. In a preferred embodiment of the invention, the composition obtained after step (d) is dried in step (e) at a temperature of 80° C. and at 20 mbar. Depending on the drying method used, the amount of water in the end product should be generally comprised between 30 and 35% w/w. A composition of the invention is found to be stable at room temperature for at least one year.

The invention also provides compositions, which are obtainable by the process of the invention. These compositions comprise an oil, wherein said oil comprises at least 70% w/w of triglycerides, preferably at least 80% w/w, more preferably at least 90% w/w or most preferably at least 95% w/w, and at least 10% w/w of arachidonic acid, more preferably at least 20% w/w, even more preferably at least 30% w/w, most preferably at least 35% w/w, whereby at least 50% w/w, preferably at least 65% w/w, more preferably at least 80% w/w. most preferably at least 90% w/w of said arachidonic acid is esterified to the glycerol moiety of a triglyceride. Preferably, the oil comprised in the compositions of the invention is a vegetable oil.

These compositions can be used for flavouring food products like soups, meat, pasta, vegetables etc. Therefore the invention also provides with food products comprising the compositions of the invention.

Furthermore the invention provides with the use of an oil rich in arachidonic acid whereby said arachidonic acid is esterified to the glycerol moiety of a triglyceride, for the production of a chicken flavour. Preferably said oil is a vegetable oil.

The invention will now be illustrated by one example, which however should not be seen as limiting the invention in any way.

EXAMPLE 1

| Ingredients | |
|---|---|
| L-Cysteine•HCl•H$_2$O | 60.00 g |
| Dextrose | 51.00 g |

-continued

| Ingredients | |
|---|---|
| 33% NaOH solution | 53.50 g |
| 65% Gistex ® liquid | 169.00 g |
| Optimar ® oil | 2.78 g |
| Water | 222.00 g |

A composition with a chicken flavour is prepared using the following method.

A mixture of water, 65% Gistex® liquid (a yeast extract obtained from DSM N.V., The Netherlands), cysteine and dextrose was prepared and the pH was adjusted to a value of 6.0 by addition of 33% NaOH (43.30 g). The reaction mixture was heated under reflux at 100° C. for 90 minutes. Afterwards the temperature was cooled down at less than 80° C., the pH was adjusted to 6.15 with the remaining amount of 33% NaOH and the Optimar® oil (an oil containing arachidonic acid esterified to a triglyceride obtained from DSM N.V., The Netherlands) was added. This composition was heated at 80° C. for 30 minutes. The composition was dried at 80° C. under oven-vacuum (20 mbar) for 5 hours.

EXAMPLE 2

To a general (spicy) bouillon the chicken flavour of the present invention was added. A general (spicy) bouillon was obtained by mixing:

| | |
|---|---|
| Gistex XII pdr (DSM) | 46.16 g |
| Salt | 28.63 g |
| PlantexCCH62 (DSM) | 13.64 g |
| PlantexCCH22 (DSM) | 6.13 g |
| Maltodextrin | 5.35 g |
| Turmeric | 0.032 g |
| Celery seed powder | 0.020 g |
| Garlic powder | 0.016 g |
| White pepper | 0.006 g |
| Nutmeg powder | 0.004 g |
| Cloves | 0.002 g |
| Flavour profile: General spicy bouillon | |

Addition of 0.32 gram of the chicken flavour of Example 1 shifts the flavour profile from "general bouillon" to skinny type of chicken bouillon Gistex® is an autolyzed yeast extract of baker's yeast from a natural way of enhancing an enriching the taste of savoury flavoured foods. The amino acids present add a bouillon-type brothy taste without adding any specific notes.

the Plantex® range of products consists of well balanced, tailor made flavouring compounds based on yeast extracts. The range contains no acid hydrolysed vegetable proteins.

Also the flavour of other general bouillons can be shifted into chicken bouillons by the addition of the chicken flavour of the invention.

EXAMPLE 3

Tandoori Chips

In the production of chips, 0.1% of the chicken flavour of Example 1 was added to the tandoori seasoning. The tandoori chips had a nice cooked chicken meat appearance.

EXAMPLE 4

| Ingredients | |
|---|---|
| L-Cysteine•HCl•H$_2$O | 2.75 g |
| Thiamine | 0.88 g |
| L. leucine | 12.5 g |
| Dextrose | 10.0 g |
| 25% NaOH solution | 15.0 g |
| 65% Gistex ® liquid | 33.0 g |
| Trisun oil (partially hydrogenated sunflower oil) | 22.0 g |
| Water | 40.0 g |

A composition with a chicken flavour is prepared using the following method. A mixture of water, 65% Gistex® liquid (a yeast extract obtained from DSM N.V., The Netherlands), Trisun oil (HS 500, Humko oil, Memphis USA), cysteine, thiamine, leucine and dextrose was prepared and the pH was adjusted to a value of 5.7 by addition of 25% NaOH (12.5 g). The reaction mixture was heated under reflux at 98° C. for 90 minutes. Afterwards the temperature was cooled down to 79° C., the pH was adjusted to 5.8 with the remaining amount of 25% NaOH.

The reaction mixture was added to 274 g of Maxarome® paste standard (DSM), cooled to 20° C. under stirring. Maxarome® yeast extract standard is a powerful taste enhancer, combining naturally present 5'nucleotides (IMP and GMP) and a meaty, bouillon taste. The effect of adding Maxarome® building blocks is usually described as 'mouthfeel' or umami.

To 30 g of the cooled mixture was added:

A—0.045 g of arachidonic acid and 0.045 g of Trisun.
  This mixture was heated for 30 minutes at 80° C., cooled down and dried in a vacuum oven at 80° C. and 20 mbar. The dried mixture was grind and stored.

B—0.048 g of methyl ester of arachidonic acid and 0.048 g of Trisun.
  This mixture was heated for 30 minutes at 80° C. cooled down and dried in a vacuum oven at 80° C. and 20 mbar. The dried mixture was grind and stored.

C—0.055 g of ethyl ester of arachidonic acid and 0.05 g of Trisun.
  This mixture was heated for 30 minutes at 80° C. cooled down and dried in a vacuum oven at 80° C. and 20 mbar. The dried mixture was grind and stored.

D—0.052 g of isopropylester of arachidonic acid and 0.05 of Trisun.
  This mixture was heated for 30 minutes at 80° C. cooled down and dried in a vacuum oven at 80° C. and 20 mbar. The dried mixture was grind and stored.

E—0.15 g of Optimar oil (see Example 1)
  This mixture was heated for 30 minutes at 80° C. cooled down and dried in a vacuum oven at 80° C. and 20 mbar. The dried mixture was grind and stored.

F—0.1 g of Optimar oil.
  This mixture was heated for 30 minutes at 80° C. cooled down and dried in a vacuum oven at 80° C. and 20 mbar. The dried mixture was grind and stored.

G—0.05 g of Optimar oil.
  This mixture was heated for 30 minutes at 80° C. cooled down and dried in a vacuum oven at 80° C. and 20 mbar. The dried mixture was grind and stored.

H—No additions.
  This mixture was heated for 30 minutes at 80° C. cooled down and dried in a vacuum oven at 80° C. and 20 mbar. The dried mixture was grind and stored.

Flavour/Taste Analysis.

To 100 g of water containing 0.6 g NaCl, 0.2 g of the dried mixture (obtained as described above) was added.

| Flavour/taste analysis | Directly after production | After storage during 15 months at 20° C. |
|---|---|---|
| A | Smell: ransic chicken fat | Smell: ransic, chicken fat |
|   |   | Taste: green ransic fat |
| B | Smell: no chicken, slightly fruit | Smell: no chicken, slightly fruit |
|   |   | Taste: bouillon, no chicken fat notes |
| C | Smell: no chicken notes | Smell: no chicken notes |
|   |   | Taste: bouillon, no chicken |
| D | Smell: no chicken notes | Smell: no chicken notes |
| E | Smell: cooked chicken, fatty | Smell: cooked chicken, fatty |
|   | Taste: chicken soup, boiled | Taste: chicken soup, boiled |
| F | Smell: slightly stronger fatty chicken (compared with E) | Smell: slightly stronger fatty chicken (compared with E) |
|   | Taste: bouillon, fatty chicken | Taste: bouillon, fatty chicken |
| G | Smell: weak, fatty chicken | Smell: weak fatty chicken |
|   | Taste: bouillon, slightly chicken fat | Taste: bouillon, slightly chicken fat |
| H | Smell: sweet, bouillon, no chicken | Smell: sweet, bouillon, no chicken |
|   | Taste: bouillon, meaty chicken | Taste: bouillon, meaty |

Free arachodonic acid is changing the flavour into a ransic chicken fat directly from the start. The methyl, ethyl and Isopropyl esters do not generate the characteristic chicken fat notes, which does not change after 15 months of storage at 20° C.

After 15 months of storage at 20° C. the sample containing triglyceridelarachidonic acid is compared with a fresh prepared sample, still characteristic for cooked chicken fat.

The invention claimed is:

1. A method for producing a second composition with chicken flavour the method comprising:
   (a) a providing a first mixture comprising at least one reducing carbohydrate and at least one amino acid that has been kept at a temperature sufficient for the reducing carbohydrate and amino acid to react with each other; and
   (b) adding to said first mixture a first composition comprising arachidonic acid that is esterified at at least 90% w/w to the glycerol moiety of a triglyceride, wherein the first composition comprises at least 70% w/w of triglycerides and at least 10% w/w of esterified arachidonic acid, to obtain a second mixture; and (c) keeping the second mixture at a temperature sufficient for the chicken flavour to develop, wherein the second mixture is heated between 5 and 60 minutes at a temperature between 70 and 100° C., whereby the second composition is produced.

2. The method of claim 1 wherein the first composition of (b) is an oil.

3. The method of claim 2, wherein the oil is from a microbial or fermentation source.

4. The method of claim 1 which further comprises:
(d) drying the second composition obtained in step (c).

5. The method of claim 1 wherein reducing carbohydrate is between 1 and 10% w/w of the total ingredients and wherein the molar ratio between reducing carbohydrate and amino acid in the first mixture is between 0.5 and 1.5, and wherein the first and second mixture further comprise water.

6. The method of claim 5 wherein the amount of water in the first and second mixture is between 20 and 80% w/w of the total ingredients.

7. The method of claim 1 wherein the first mixture has been kept at a temperature between 70 and 120° C. for a period of time between 0.5 and 5 hours.

8. The method of claim 1 wherein the amount of the first composition in (b) is between 0.1 and 2% w/w of the total ingredients.

9. The method of claim 1 wherein the at least one amino acid is cysteine.

10. The method of claim 1 wherein the reducing carbohydrate is selected from the group of: L- or D-ribose, D-xylose, dextrose, L-arabinose, L-rhamnose, L-fructose.

11. The method of claim 10 wherein the reducing carbohydrate is dextrose.

12. The method of claim 1 wherein the pH of the first or second mixture is between 4 and 8.

13. The method of claim 1 wherein a yeast extract is added to the first or second mixture.

14. The method of claim 2 wherein the first composition of (b) is a vegetable oil.

15. The method of claim 1 wherein the first composition of (b) comprises at least 20% w/w of esterified arachidonic acid.

16. The method of claim 1 wherein the first composition of (b) comprises at least 30% w/w of esterified arachidonic acid.

17. The method of claim 1 wherein the first composition of (b) comprises at least 80% w/w of triglycerides.

18. The method of claim 1 wherein the first composition of (b) comprises at least 90% w/w of triglycerides.

19. The method of claim 5 wherein the reducing carbohydrate is between 1 and 5% w/w of the total ingredients and wherein the molar ratio between the reducing carbohydrate and the amino acid in the reaction mixture is between 0.5 and 1.5.

20. The method of claim 5 wherein the reducing carbohydrate is 2% w/w of the total ingredients and wherein the molar ratio between the reducing carbohydrate and the amino acid in the reaction mixture is between 0.5 and 1.5.

21. The method of claim 5 wherein the reducing carbohydrate is between 1 and 5% w/w of the total ingredients and wherein the molar ratio between the reducing carbohydrate and the amino acid in the reaction mixture is between 0.8 and 1.2.

22. The method of claim 5 wherein the reducing carbohydrate is 2% w/w of the total ingredients and wherein the molar ratio between the reducing carbohydrate and the amino acid in the reaction mixture is between 0.8 and 1.2.

23. The method of claim 5 wherein the reducing carbohydrate is between 1 and 10% w/w of the total ingredients and wherein the molar ratio between the reducing carbohydrate and the amino acid in the reaction mixture is between 0.8 and 1.2.

24. The method of claim 7 wherein the first mixture has been kept at a temperature between 80 and 120° C. for a period of time between 1 and 2 hours.

25. The method of claim 7 wherein the first mixture has been kept at a temperature between 98 and 100° C. for a period of time between 80 to 100 minutes.

26. The method of claim 8 wherein the amount of the first composition in (b) is between 0.2 and 1% w/w of the total ingredients.

27. The method of claim 8 wherein the amount of the first composition in (b) is between 0.3 and 0.8% w/w of the total ingredients.

28. The method of claim 8 wherein the amount of the first composition in (b) is between 0.4 and 0.6% w/w of the total ingredients.

29. The method of claim 1 wherein the second mixture in (c) is heated at 80° C. for 30 minutes.

30. The method of claim 12 wherein the pH of the first or second mixtures is between 5 and 7.

31. The method of claim 12 wherein the pH of the first or second mixtures is between 5.5 and 6.

* * * * *